Jan. 26, 1965   W. M. CLINE ETAL   3,167,334
SEGMENTAL HOSE FITTING
Filed Sept. 24, 1958

INVENTOR
WILLIAM M. CLINE
WILLIAM G. CLEMONS
BY Beaman & Beaman
ATTORNEY

United States Patent Office 3,167,334
Patented Jan. 26, 1965

3,167,334
SEGMENTAL HOSE FITTING
William M. Cline, Rives Junction, and William G. Clemons, Jackson, Mich., assignors to Aeroquip Corporation, Jackson, Mich., a corporation of Michigan
Filed Sept. 24, 1958, Ser. No. 763,020
1 Claim. (Cl. 285—243)

The present invention relates to segmented end fittings for flexible hose and particularly is related to reusable fittings for large size hose.

The segmental socket hose fitting is particularly adapted for use with hose of 2½" internal diameter and larger in that such fittings may be readily assembled without special equipment and it is one of the objects of the invention to provide a hose fitting which may be affixed to a large hose, for example having 6" I.D., by one man using conventional hand tools.

A serious problem encountered in fittings used with resilient hose occurs with ageing of the hose. As ribs, serrations and the like are usually employed in the socket and nipple construction to increase the "blow off" resistance of the fitting and increase the union with the hose, pressure points in the rubber or other resilient material of the hose are created and as the hose ages the rubber tends to slowly flow away from these pressure points resulting in a loosening of the original "grip" the fitting had on the hose and a lowering of the "blow off" pressure point. The above described flow or creep is especially noticeable with large size hose and fittings wherein the amount of rubber engaged by the fitting is substantial and in segmental fittings employing bolts to draw the segments together it is necessary to periodically tighten the bolts to maintain the initial "blow off" resistance due to this effect.

As such periodic tightening of the segment bolts is often neglected, fitting failures may occur and thus it is a further object of the invention to provide a hose fitting wherein means are provided for automatically compensating for rubber flow and maintaining an adequate union with the hose over long periods of time.

A further object of the invention is to provide a segmental hose fitting wherein many of the components may be produced from stampings and be economically and uniformly manufactured.

Yet a further object of the invention is to provide a reusable segmental hose fitting which is lightweight and easy to assemble to the hose and which compensates and adjusts itself to accommodate hose of irregular wall thickness.

Figures 1, 2:
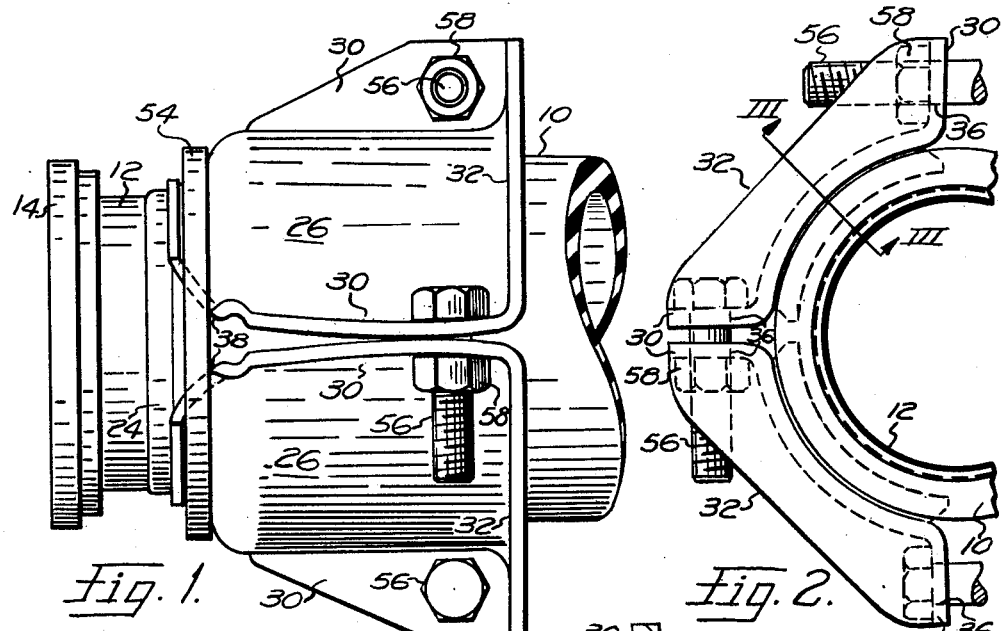
Figure 3:
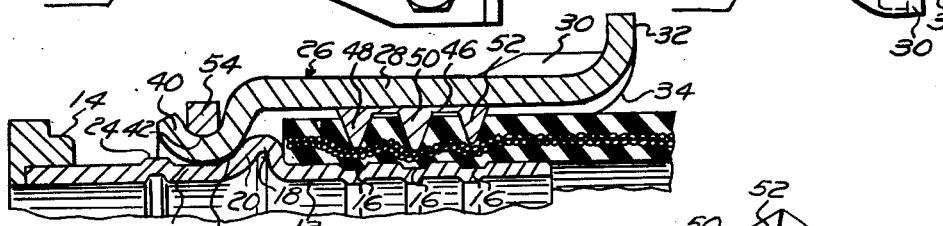
Figures 4, 5:
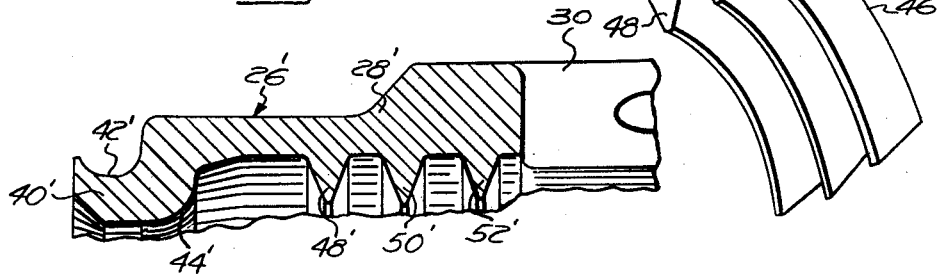
Figure 6:
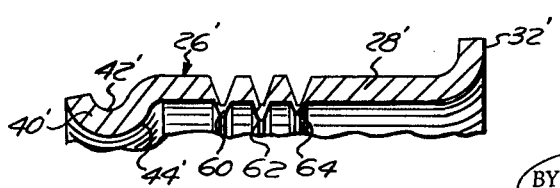

These and other objects of the invention residing in the details of construction of the invention will appear from the following description and accompanying drawings wherein:

FIG. 1 is an elevational view of an assembled segmental fitting and hose in accordance with the invention, FIG. 2 is an end elevational view of the assembly of FIG. 1 taken from the right side thereof, FIG. 3 is a sectional elevational view taken along the line III—III of FIG. 2, FIG. 4 is a perspective view of the segment serration insert of FIG. 3, FIG. 5 is a modification of segment and integral serration construction shown in sectional elevation, and FIG. 6 is another modification of integral segment and serration construction.

As illustrated, the hose 10 may be of a conventional type usually consisting of a synthetic rubber inner liner reinforced by a wire woven braid covering which is encased by another layer of synthetic rubber. Such hose is well known in the art and the specific construction forms no part of the invention. It will be understood that the fitting of the invention may be used with flexible hose other than that illustrated and that the advantages and operation of the fitting are the same regardless of the type of resilient hose employed.

The fitting includes a tubular nipple 12, a portion of which is inserted into the hose. An annular nipple shoulder 14 is affixed to the nipple 12 to provide for the terminal and coupling structure which also is employed with the fitting but does not form a part of the present invention and is not illustrated. The nipple 12 preferably has an outer diameter equal to the minimum tolerance of the hose internal diameter specifications to insure that the nipple may be inserted into the hose with little effort.

A plurality of annular serrations 16 are formed on the nipple's outer surface in spaced axial arrangement defining recesses into which the material of the hose is pressed as will be later apparent. An annular abutment 18 is also formed on the surface of the nipple and projects substantially at right angles to the nipple axis to engage the end of the hose limiting and determining insertion of the nipple into the hose. The left surface of abutment 18, as viewed in FIG. 3, is sloped to present a conical seat 20 merging with a cylindrical portion 22 of the nipple. Another annular projection 24 is formed on the exterior surface of nipple 12 for the purpose of preventing excessive movement of the socket segments during assembly, as will be later described, and is located adjacent portion 22 intermediate the shoulder 14 and the abutment 18.

The nipple 12 may either be formed from a machined or stamped part, however, from a cost standpoint the stamped construction is most desirable and this is the construction shown in FIG. 3 wherein it is apparent that the serrations, abutments and projection are formed by displacement of the nipple wall.

The socket of the fitting consists of a plurality of segments 26 which are affixed to the nipple and compress the hose material into tight engagement with the nipple to insure fluid tight sealing as well as grip the hose to prevent "blowing off" of the fitting under pressure. The number of segments used with a fitting may vary, however, the arcuate summation of the segments must be 360° to provide equal hose clamping throughout the hose periphery. Usually, fittings for hose of less than 4" I.D. employ four segments each extending over approximately 90° of the hose periphery, hose from 4" to 7" employ five segment of substantially 72° each, generally the larger the hose the more segments used to facilitate assembly and prevent the size of the segments from becoming excessive.

The segments 26 are preferably formed of steel stampings, however, aluminum stampings or other material having the desired strength and other characteristics may be used, and include an arcuate portion 28 substantially conforming to the arc of the hose. The edges of the portion 28 are deflected outwardly at an angle to the portion 28 to define a pair of planar ears 30 which extend in radial directions with respect to the hose axis. The outer end of the segment is bent up in a direction perpendicular to the hose axis to provide a reinforcing web 32 which interconnects the ears 30 of each segment and materially strengthens the entire segment. It will be noted that the web 32 produces a radius 34 which prevents damage to the hose upon deflection of the hose axis from that of the fitting such as occurs when the hose bends adjacent the fitting. The ears 30 form an important function of the invention and being formed of a planar, relatively thin member will be capable of deflection without exceeding their elastic limit or experiencing other permanent damage. A hole 36 is drilled in each ear near the web 32 to provide for the bolts holding the segments together.

The inner end of the segment 26 is tapered as at 38 and is formed with a hooked portion 40 which functions as a hinged connection as will be later apparent. As viewed in the drawings the hook 40 defines an upper surface 42 and a lower arcuate shoulder 44 which cooperates with the seat 20 in the assembled state.

To produce a firm grip between the hose and socket segment, each segment is provided with a plurality of serrations adapted to penetrate the outer rubber hose covering and these serrations may take several forms as evidenced by the modifications of FIGS. 5 and 6. Referring to FIGS. 3 and 4 the serrations may take the form of an insert 46 having a convex surface corresponding to the inner concave surface of the segments 26. The insert may thus be welded, brazed or otherwise affixed to the segment forming an integral part thereof. In the usual form the insert 46 will include three serrations 48, 50 and 52 for penetration of the hose and engagement with the wire reinforcing within the hose. As noted in FIG. 3, the serrations 48–52 are axially positioned and spaced so as to directly overlie the serrations 16 formed in the nipple surface when the fitting is assembled as in FIG. 3. The depth of the serrations and their relationship to the surface 42 of the hook are significant and these details are later described.

The segments 26 are held in position at the hooked end by a floating fulcrum ring 54 having an inner arcuate surface for cooperation wtih the hook surface 42. The ring 54 is of sufficient diameter to permit the hooks 40 to be inserted between the ring and the nipple portion 22 wherein a clearance gap between the portion 22 and hook is provided enabling the segments to automatically adjust to the hose thickness and prevent binding of the segments.

The fitting and hose 10 are assembled in the following manner:

To provide proper abutment of the end of the hose with the abutment 18 the hose end is cut off square, e.g. perpendicular to the hose axis. The fulcrum ring 54 is then slipped over the nipple 12 and the nipple inserted into the hose to abut the hose end against member 18. At this time the ring 54 will be loosely encompassing the nipple somewhere between the end of the hose and the nipple shoulder 14 as the I.D. of the ring is less than the O.D. of the hose but greater than the O.D. of the abutment 18. The ring 54 is then axially located intermediate the conical seat 20 and the projection 24 and the hooked portion 40 of the segments 26 are inserted under ring 54 and the segments evenly spaced about the hose circumference. It will be apparent that to insert the hook 40 under the ring the outer end of the segment must be held away from the hose to prevent interference with the abutment 18, however, once the hook is under the ring and the segment "hinged" about the ring toward the hose the projection 24 and seat 20 prevent extensive axial movement of the segment and the segment will remain hooked to facilitate the final stages of the assembly.

After all the segments 26 are properly placed under the ring the ring 54 is moved toward the hose until the shoulder 44 of the hooks engages the seat 20 and the segments are rocked toward the hose until the serrations 48 make contact therewith. Bolts 56 are then inserted into the holes 36 of adjacent ears 30 and nuts 58 are threaded thereon. The operator now proceeds to tighten the nuts 58, each nut being given a few turns at a time to prevent uneven distribution of clamping pressure about the hose. As the nuts 58 are tightened the segments 26 will be drawn radially inward imbedding the serrations 48–52 into the hose, these serrations penetrate the outer rubber layer and directly contact the woven wire reinforcing which brinells into the tips of the serrations. As is apparent in FIG. 3 the serrations 48–52 compress the hose into the serrations 16 of the nipple to increase sealing and friction between the hose and nipple and displace the wire reinforcing in a sine wave pattern obtaining a firm connection between the socket segments and the hose.

Tightening of the bolts continues until the adjacent ears 30 are deflected from a planar configuration and "bow" toward each other, note FIG. 1, whereupon after a sufficient deflection has taken place the assembly is complete. It will be appreciated that since the segments 26 are formed of a relatively heavy gage steel, for instance the segments for a 3 inch hose use 5 gage steel (.209), and the holes 36 are not far removed from the webs 32, with the force required to visibly deflect the ears is considerable and thus upon visible deflection of the ears a connection capable of withstanding pressures above 1,200 p.s.i. is achieved.

The purpose of the deflection of the ears 30 is to counteract the tendency of the fitting to relax its grip on the hose because of the cold-flow of the rubber away from the compression points. Experience with conventional bolt retained segmented fittings has proven that the bolts tend to loosen over a period of time due to the rubber within the hose "flowing" away from the pressure points created in the hose by the serrations and the segments and it is necessary to retighten the bolts periodically to maintain the original efficiency of the fitting. This occurrence decreases the "grip" of the fitting on the hose and lowers the blow off pressure providing a weakness in the fluid system. The use of deflectable ears compensates to a significant extent for flowing or creeping of the hose rubber from the points of high compression by employing the resiliency of the ears to maintain sufficient bolt tension, even though the rubber flows, to effect a firm engagement of the serrations 48–52 with the hose and prevents a significant decrease in the blow off pressure from occurring. The action of the ears is automatic and maintenance and inspection of this type of fitting is much less than those fittings of the aforementioned conventional type.

As the shoulder 44 of the segment hooks engages the conical seat 20 of the abutment 18 during tightening of the bolts 56 the inclination of the seat will tend to urge the segments toward the left, FIG. 3, thereby maintaining the end of the hose in tight engagement with the abutment 18 to aid in achieving an effective fluid seal. Also the fact that shoulder 44 is radiused provides a smooth action at the line of contact with the seat 20 and prevents binding.

As the hose 10 may vary in thickness as much as .050", the possibility of a like eccentricity between the nipple and segments is present and could result in unequal compression by the segments 26 if compensating means are not provided. Compensation for hose variations is achieved by the disclosed fitting by the use of the floating fulcrum ring 54, the seat 20 and the radius of shoulder 44 which permits the outer surface of the hose to determine the axis of the socket elements enabling the segments to be self centering. As contact between shoulder 44 and seat 20 is in the form of an arcuate line the shoulder may contact the seat at any radial distance and draw the hose to the left as described thus limited variations in the hose thickness does not affect the operation or effectiveness of the fitting.

The serrations 48–52 are most effective upon the wire of the hose "brinelling" or becoming slightly imbedded into the tip of the serrations and this operation is best accomplished without excessive damage to the hose or requiring excessively long bolts 56 if the serration 50 is slightly deeper than 48 or 52 and 48 is slightly deeper than 52. For instance with a 6 inch hose, and using the point on hook surface 42 closest to the nipple axis as a reference point, the serration 48 projects .220" toward the nipple axis, 50 extends .250″ and 52 projects .200″ and the axial distances of the serrations tip from the reference point is 1.730″ for serration 48, 2.330″ for 50 and 2.930″ for 52. This relationship distributes the gripping forces substantially evenly between the serrations when the segments are parallel to the nipple and permits bolts of medium length to be used.

Modifications of segments and serration construction are illustrated in FIGS. 5 and 6 wherein elements similar to those described above are similarly designated by primes. In FIG. 5 an integral segment construction is shown as may be formed by casting and machining the segments rather than using stampings. Such construction is heavier than stamped segments and is used particularly with larger hose sizes. Serration relationships and proportions similar to those described in conjunction with FIG. 3 are preferably maintained with all segment constructions. The segment of FIG. 6 is formed from stamped steel and is very economical to manufacture. In this design the serrations 60–64 are formed from the material of the segment itself and the remainder of the segment is identical to that shown in FIGS. 1–3. This construction may be used in all hose sizes and the cost of manufacture makes this embodiment preferable to other constructions.

It will be understood that the principles and the spirit of the invention may be practiced with other embodiments of the invention than those described, for instance, the deflectable elements may take many forms and relationships to the hose and the means interconnecting the deflectable elements may be a clamping ring or any other member which places the deflectable members under stress whereby compensation for flowing of the hose rubber is achieved.

We claim:

A detachable, reusable flexible hose end fitting characterized by its ease of assembly, adaptability to large size hose and ability to compensate for hose material flow comprising a nipple having a cylindrical portion insertable into the bore of the hose, a radial abutment annularly formed on the exterior of said nipple axially spaced from said cylindrical portion and engageable with the end of the hose, a segmented socket for embracing and compressing a hose mounted on said nipple, said socket comprising segments having generally cylindrical inner and outer surfaces and first and second means at opposite ends to support said segments assembled on said nipple in a contracted position, resilient deflectable members mounted on said segments and comprising radially extending ear portions formed from the material of the segments, an arcuate hook portion defined on each of said segments adapted to engage said first means as a fulcrum end wherein said first means holds said hook portions against radially outward movement, bolt means extending through openings defined in said deflectable members and interconnecting the deflectable members of adjacent segments, said bolt means comprising said second means whereby tightening of said bolt means contracts said segments compressing the hose on said nipple and said deflectable members are deflected under the tension of said bolts such that said members maintain tension in said bolts upon flowing of the hose material between said segments and said nipple, said segments when applied and before said compression being spaced from each other, and a reinforcing web interconnecting said deflectable members at one end thereof.

References Cited in the file of this patent

UNITED STATES PATENTS

| | | |
|---|---|---|
| 548,932 | Snyder | Oct. 29, 1895 |
| 1,072,896 | Albee | Sept. 9, 1913 |
| 1,133,080 | Williams | Oct. 6, 1914 |
| 1,212,817 | Russell | Jan. 16, 1917 |
| 2,512,741 | Goodall | June 27, 1950 |
| 3,019,038 | Cline | Jan. 30, 1962 |

FOREIGN PATENTS

| | | |
|---|---|---|
| 679,039 | France | Jan. 5, 1930 |
| 133,909 | Great Britain | Oct. 23, 1919 |
| 737,252 | Germany | June 3, 1957 |